(12) United States Patent
Brickwedde et al.

(10) Patent No.: US 12,049,211 B2
(45) Date of Patent: Jul. 30, 2024

(54) INFORMATION, WARNING AND BRAKING REQUEST GENERATION FOR TURN ASSIST FUNCTIONALITY

(71) Applicant: WABCO GmbH, Hannover (DE)

(72) Inventors: Fabian Brickwedde, Braunschweig (DE); Kaustubh Joshi, Hannover (DE); Richard Matthaei, Hameln (DE)

(73) Assignee: ZF CV Systems Europe BV, Brussels (BE)

( * ) Notice: Subject to any disclaimer, the term of this patent is extended or adjusted under 35 U.S.C. 154(b) by 783 days.

(21) Appl. No.: 17/258,198

(22) PCT Filed: Jun. 19, 2019

(86) PCT No.: PCT/EP2019/066113
§ 371 (c)(1),
(2) Date: Jan. 6, 2021

(87) PCT Pub. No.: WO2020/011501
PCT Pub. Date: Jan. 16, 2020

(65) Prior Publication Data
US 2021/0268998 A1    Sep. 2, 2021

(30) Foreign Application Priority Data

Jul. 12, 2018 (DE) ................ 10 2018 116 857.8

(51) Int. Cl.
*B60T 7/12* (2006.01)
*B60Q 9/00* (2006.01)
*G08G 1/16* (2006.01)

(52) U.S. Cl.
CPC ............. *B60T 7/12* (2013.01); *B60Q 9/008* (2013.01); *G08G 1/166* (2013.01);
(Continued)

(58) Field of Classification Search
None
See application file for complete search history.

(56) References Cited

U.S. PATENT DOCUMENTS 8,310,335 B2    11/2012   Sivakkolundhu
2013/0253815 A1   9/2013   Orfila et al.
(Continued)

FOREIGN PATENT DOCUMENTS

DE    102005039525 A1   2/2007
DE    102008033432 A1   1/2010
(Continued)

OTHER PUBLICATIONS

Machine translation of DE-102010048144-A1 (Year: 2011).*
(Continued)

*Primary Examiner* — Amelia Vorce
*Assistant Examiner* — Kyle S Park
(74) *Attorney, Agent, or Firm* — Dickinson Wright PLLC

(57) ABSTRACT

A method for warning a driver of a vehicle (1), in particular a truck, in turn maneuvers includes the following steps: generating (S1) an adaptive monitoring area (2) for the vehicle (1) based on at least a maximum lateral acceleration (4) of the vehicle (1) at a current longitudinal velocity (6) of the vehicle (1); identifying (S2) a vulnerable road user (VRU) (8) within the adaptive monitoring area (2); determining (S3, S4) a driver's intention to turn (40) the vehicle (1); determining S5) whether there is a collision risk between the vehicle (1) and the VRU (8); and outputting a warning signal (SW) based on the determined collision risk.

19 Claims, 4 Drawing Sheets

(52) U.S. Cl.
 CPC ..... *B60T 2201/022* (2013.01); *B60T 2250/03* (2013.01); *B60T 2250/04* (2013.01)

(56) References Cited

U.S. PATENT DOCUMENTS

| | | | | |
|---|---|---|---|---|
| 2016/0318445 | A1* | 11/2016 | Sugimoto | G06F 3/00 |
| 2017/0193384 | A1* | 7/2017 | Mudalige | G08G 1/161 |
| 2018/0154889 | A1* | 6/2018 | Minemura | G08G 1/163 |
| 2018/0178721 | A1 | 6/2018 | Ikedo et al. | |
| 2018/0233048 | A1* | 8/2018 | Andersson | G08G 1/0112 |
| 2019/0212439 | A1* | 7/2019 | Nohl | B60T 8/17558 |

FOREIGN PATENT DOCUMENTS

| | | |
|---|---|---|
| DE | 102009041556 A1 | 6/2010 |
| DE | 102010048144 A1 | 7/2011 |
| DE | 102011077384 A1 | 12/2012 |
| DE | 102012108563 A1 | 3/2014 |
| DE | 102014202385 A1 | 8/2015 |
| DE | 102014212047 A1 | 12/2015 |
| DE | 102016116963 A1 | 3/2018 |
| EP | 1504276 A2 | 2/2005 |
| EP | 1508476 A2 | 2/2005 |
| EP | 2084045 A1 | 8/2009 |
| JP | 2009271766 A | 11/2009 |
| JP | 2016107722 A | 6/2016 |
| WO | 2017030492 A1 | 2/2017 |
| WO | 2017030493 A1 | 2/2017 |

OTHER PUBLICATIONS

European Patent Office, Rijswijk, Netherlands, International Search Report of International Application No. PCT/EP2019/066113, Mailed Oct. 14, 2019, 4 pages.

* cited by examiner

INFORMATION, WARNING AND BRAKING REQUEST GENERATION FOR TURN ASSIST FUNCTIONALITY

TECHNICAL FIELD

The invention relates to a method for warning a driver of a vehicle, in particular a truck, in turn maneuvers, as well as a computer program and a turn assist system for a vehicle, in particular a truck.

BACKGROUND

Advancements in available sensor technologies allow for improved safety systems for vehicles. One such improved system is an arrangement and method for detecting and avoiding collisions. This type of system is referred to as a driver assistance system. Driver assistance systems can include sensors located on the vehicle to detect an oncoming collision. The systems may warn the driver of various driving situations to prevent or minimize collisions using any number of available warning systems. Furthermore, driver assistance systems can provide specialized warnings for any number of conditions that could potentially lead to a collision. For example, alerts may be provided for lane departure warnings, forward collision, warnings, blind spot detection, etc.

Existing warning systems typically provide either an audible warning, a dashboard/windshield mounted visual cue, or a combination of the two. The dashboard/windshield mounted visual cues assume that the driver is attentive and forward facing. In cases where the driver is not attentive, or is looking elsewhere, the dashboard/windshield mounted visual cues are ineffective.

In addition, different drivers have different average reaction times in response to a vehicle alert. For example, some drivers take longer than others to response to an alert produced from a vehicle. Such drivers may not have enough time to react appropriately in response to the warning, which may result in compromising their safety or the safety of others around them. Other drivers may react quickly to warnings or alerts, such that an alert may come too early and be an annoyance. These drivers may attempt to deactivate the alert system altogether to avoid the annoyances of early alert signals. Accordingly, there exists a need for a driver alert system that provides safety benefits for various different kinds of drivers.

DE 10 2014 212 047 discloses a method for operating a vehicle, including the following: detection of a vehicle environment; detection of a steering angle for a vehicle wheel that is defined by a steering device; ascertainment of a collision probability for the vehicle based on the detected vehicle environment and the detected steering angle in the case of an unchanged steering angle; correction of the steering angle if the ascertained collision probability is greater than or equal to a predetermined collision probability threshold in order to prevent a collision. Also described is a device for operating a vehicle and a computer program.

DE 10 2012 108 563 A1 discloses a system for a truck, which issues a first level warning signal when a second vehicle is identified in vicinity of the truck. The system moreover determines an actual movement of the truck into the direction of the second vehicle, e.g. due to a line change, and then issues a second level warning signal. The actual movement is determined based on a camera image of the road in front of the truck and a steering wheel angle, a lateral velocity and/or a yaw rate. Moreover, a trajectory prediction of the second vehicle might also be taken into account when issuing the warning signals.

Known systems may also use the turn indicator signal for triggering a warning signal or to determine a line change intention of the driver. Such a system for example is disclosed in DE 10 2011 077 384 A1, DE 10 2008 033 432, or EP 1 508 476 A1.

Most systems use fixed warning or monitoring areas, which may be provided around the vehicle. One example in connection with a truck is disclosed in U.S. Pat. No. 8,310, 335 B2. The system uses three areas, one in front of the truck, and one on each lateral side. The areas have a rectangular shape and a signal is generated as soon as an object enters one of the areas.

EP 1 504 276 B1 discloses an imaging system for a vehicle comprising: an imaging array sensor comprising a plurality of photo-sensing pixels, the imaging array sensor being positioned at the vehicle and having a field of view exteriorly of the vehicle, the imaging array sensor being operable to capture an image data set representative of a scene occurring exteriorly of the vehicle and in the exterior field of view of the imaging array sensor, and a processor for processing the captured image data set, the processor including a microprocessor comprising an edge detection algorithm. The processor selects a reduced image data set of said image data set and applies the edge detection algorithm to the reduced image data set of the image data set to detect edges of objects present exteriorly of the vehicle and within a target zone within the exterior field of view of the imaging sensor. The reduced image data set is representative of the target zone within the exterior field of view of the imaging sensor. The processor is operable to process the reduced image data set more than other image data of the image data set to detect objects present exteriorly of the vehicle and within the target zone. Moreover, the target zone encompasses a geographic area of the exterior scene where an object of interest to the driver of the vehicle is realistically expected to be present and the other image data is representative of other geographic areas of the exterior scene where an object of interest is unrealistically expected to be present or cannot be present. The target zone according to this disclosure is selected in accordance with an adjustment input comprising at least one of (a) an output from an ambient light sensor, (b) a headlamp control, (c) a manual control, (d) a daytime driving condition for the vehicle, (e) a night-time driving condition for the vehicle, (f) the vehicle travelling through or along a curved section of road, (g) an output from a separate forward facing imaging system, (h) an external lighting condition, and (i) a mathematical adjustment of the height of the camera image such that the geometry of the target zone is adjusted.

A time to collision-based approach for example is known from EP 2 084 045 A1.

From DE 10 2009 041 556 A1 a vehicle is known with a front and a lateral side, and a dead angle assistance system comprising at least a sensor at the front. The system comprises further sensors distributed over the whole lateral side of the vehicle for observing the area adjacent the lateral side. The observed area is dependent on the vehicle speed. When the speed is higher, the observed area on the lateral side of the vehicle is smaller.

SUMMARY

It is desirable to provide a method computer program and turn assist system, which are improved in view of false detection and unnecessary information to the driver. It is desirable that the driver is informed in vulnerable situations, however, a false detection should be avoided as much as possible.

A method according to the present disclosure comprises the steps: Generating an adaptive monitoring area for the vehicle based on at least a maximum lateral acceleration of the vehicle at a cur-rent longitudinal velocity of the vehicle; identifying a vulnerable road user (VRU) within the adaptive monitoring area; determining s driver's intention to turn the vehicle; determining whether there is a collision risk between the vehicle and the vulnerable road user; and outputting a warning signal based on the determined collision risk.

The term "adaptive" means that the size, shape and/or direction of the adaptive monitoring area is changed based on a change in the first vehicle parameter, i.e. the maximum lateral acceleration and the current longitudinal velocity. The invention is based on the idea that not only the vehicle velocity is taken into account, but also the maximum lateral acceleration at this current longitudinal velocity. The maximum lateral acceleration is the acceleration, which could be reached in a safe turn maneuver. That means, at each current longitudinal velocity, there is a certain maximum lateral acceleration, which could act on the vehicle, if the vehicle starts to turn.

Moreover, according to the invention, the driver's intention to turn is taken into account. This intention to turn might be based on a sensor signal, e.g. a steering wheel sensor or other sensors, for example, turn indicator activation sensor. Only if both, a vulnerable road user within the adaptive monitoring area and a collision risk between the vulnerable road user and the vehicle are determined, based also on the driver's intention to turn, the warning signal is outputted.

It should be understood that the driver's intention to turn may also be used to generate the adaptive monitoring area, and/or the generated adaptive monitoring area may be changed and adapted based on the driver's intention to turn.

The adaptive monitoring area preferably at least comprises a first quadrilateral in front of the vehicle. The quadrilateral in this instance refers to areas on the ground, i.e. the monitoring area usually is a volume, however, in this instance is only referred to a 2D-area in front or beside the vehicle measured from the ground. A quadrilateral could be a rectangle, or a trapezoid. In particular, a trapezoid may be contemplated, which widens or flares outwardly from the vehicle in the driving direction, to take into account uncertainty for later points of time.

Particularly preferred is that the adaptive monitoring area comprises at least a second quadrilateral and a third quadrilateral in front of the vehicle, wherein the first quadrilateral and the second quadrilateral comprise one first common side, and the second quadrilateral and the third quadrilateral comprise one second common side. This means that the quadrilaterals contact each other. Preferably, they are arranged in a direction in front of the vehicle, in particular, along a trajectory. The first common side and the second common side preferably are substantially traverse to the driving direction and, in particular, are substantially perpendicular to a driving trajectory running along and within the adaptive monitoring area. Moreover, it is preferred that the adaptive monitoring area comprises fourth, fifth, sixth and so forth quadrilaterals, each being stacked upon each other in front of the vehicle.

Preferably, the adaptive monitoring area covers a predetermined time frame for a movement of the vehicle, wherein the predetermined time frame is in the range of 1.0 seconds to 3.0 seconds, preferably at least for inner city scenarios. Preferably, the predetermined time frame is in an appropriate range for inner city scenarios. The boundaries of such a time frame are the logical borders defined by inner city scenarios. Thus, the actual size of the adaptive monitoring area will change with velocity of the vehicle, in particular, it increases. Dependent on the velocity, it is necessary to identify vulnerable road users in a greater distance to the vehicle to have sufficient time to react.

The method preferably further comprises: splitting the predetermined time frame by a predetermined number of quadrilaterals such that each quadrilateral covers a portion of the predetermined time frame. Thus, when e.g. the time frame equals 1 second, and four quadrilaterals should be used, each quadrilateral should cover a range of 0.25 seconds. The first quadrilateral, directly in front of the vehicle, covers the first 0.25 seconds, the second quadrilateral covers the second 0.25 second, and so forth. Each quadrilateral preferably is determined separately and then in a second step merged together, to form the adaptive monitoring area. For each quadrilateral of the adaptive monitoring area, the maximum lateral acceleration and the longitudinal velocity of the vehicle, as well as the driver's intention to turn, are determined. Since for quadrilaterals, which are further away from the vehicle front, uncertainty increases, these quadrilaterals usually will be larger than the ones closer to the vehicle.

Preferably, the step of generating the adaptive monitoring area for the vehicle is further based on a maximum road curve radius and/or minimum road curve radius. The maximum and minimum road curve radius are further constraints for the turning maneuver of the vehicle and it can be assumed that the turning radius of the vehicle is not lower than the minimum road curve radius at a certain spot. Both, the minimum and maximum road curve radius can be obtained from a navigation system and/or regulations of the specific country. These constraints further help to narrow the adaptive monitoring area and to avoid false detection. For example, where it is determined that a pedestrian is standing on the pedestrian's way and for a collision, the turning radius of the vehicle needs to be much lower than the minimum road curve radius at this certain point, it may be determined that there is no collision risk between the vehicle and the vulnerable road user and no warning signal is outputted.

Moreover, it is preferred that the step of generating the adaptive monitoring area for the vehicle is further based on a maximum longitudinal acceleration and or change in acceleration of the vehicle. In particular, for quadrilaterals, which are farther away from the vehicle, it needs to be taken into account that the driver could accelerate or decelerate the vehicle. Physical constraints are the maximum longitudinal acceleration at this specific longitudinal velocity of the vehicle, which might be dependent on the slope of the street, physical power of the vehicle and also load of the vehicle. Further constraints to take into account could also be the maximum velocity at the certain spot.

Further, it is preferred that the step of generating the adaptive monitoring area for the vehicle is further based on a maximum yaw rate and/or change in yaw rate of the vehicle. Moreover, also the current yaw rate can be taken into account.

Further, it is preferred that the step of determining the driver's intention to turn the vehicle includes: determining a probability that the driver intends to turn; and determining a probability of the driver is turning.

Preferably, the probability that the driver intends to turn is determined based on a steering wheel angle, a rate of change of the steering wheel angle; and a velocity of the vehicle. Preferably, the driver's intention to turn is also determined based on a turn indicator sensor. When the rate of change of the steering wheel angle is high, it is an indication, that the turn maneuver will be relatively strong, while a low rate of change identifies a smoother turn maneuver. Also, a high velocity of the vehicle normally indicates that the probability of a turn maneuver is relatively low, while a lower velocity of the vehicle might indicate a higher probability of a turning maneuver. Also, data of the navigation system could also be taken into account.

Preferably, the method further comprises: calculating a predicted steering wheel angle for the adaptive monitoring area using the steering wheel angle, the rate of change of the steering wheel angle, and the velocity of the vehicle. Based on these values, a predicted steering wheel angle for each quadrilateral of the predetermined time frame can be calculated. For calculating the predicted steering wheel angle, also a minimum and maximum road curve radius could be contemplated.

Preferably, when the determined probability that the driver intends to turn is 70% or more, it is assumed that it is the driver's intention to turn. In this step, preferably, a predefined probability threshold is used and a Bayesian probability of the driver's intention to turn is calculated. More thresholds could be used and these thresholds could be weighted against each other.

Moreover, it is preferred that the probability that the driver is turning is determined based on: a steering wheel angle; and a velocity of the vehicle. In this step, preferably, the rate of change of the steering wheel angle is not taken into account. Additionally, the turn indicator sensor can be taken into account.

Similar to the determination of the probability that the driver intends to turn, it is also preferred that when the determined probability that the driver is turning is 70% or more, it is assumed that the driver is turning. When, for example, the velocity is relatively low and the steering wheel angel is high, it is a relatively safe indicator that the driver is actually turning.

Preferably, the method further comprises, when it is determined that: a vulnerable road user is identified within the adaptive monitoring area, the driver does not intent to turn, and the driver is not turning: an information signal is output for informing the driver that a vulnerable road user is in vicinity of the vehicle. Such an output may comprise a visual output in the windshield or head-up display region of the vehicle. It may also include a warning lamp being switched on. Such warning lamp could be, e.g., mounted in the vehicle side mirror.

Moreover, when it is determined that a vulnerable road user is identified within the adaptive monitoring area, the driver intends to turn, and the driver is not turning: a warning signal is output warning the driver that a vulnerable road user is in vicinity of the vehicle and that a collision may occur when the driver actually starts turning. Such signal could be a visual signal and/or an audio signal as, e.g., a warning sound. It could also be a vibration signal, e.g., vibration of the steering wheel, when the driver actually starts turning the steering wheel. The signal should be designed such that the driver knows that when he turns a potentially dangerous situation may occur.

Furthermore, it is preferred that when it is determined that: a vulnerable road user is identified within the adaptive monitoring area; the driver intends to turn; and the driver is turning; a braking signal is output for braking the vehicle. In this situation, the vehicle automatically and autonomously brakes such that a collision between a vehicle and a vulnerable road user may be avoided.

According to a second aspect of the invention, the problem mentioned above is solved by a computer program comprising instructions, which, when the program is executed by a processor, causes the processor to carry out steps of the method according to the first aspect of the invention.

Moreover, in a third aspect of the invention, the above-mentioned problem is solved by a turn assist system for a vehicle, in particular a truck. This turn assist system is adapted for warning a driver of the vehicle in turn maneuvers, comprising a control unit for a vehicle, the control unit comprising: a memory with the computer program according to the second aspect of the invention stored thereon; and a processor configured to perform the computer program. The turn assist system according to the third aspect of the invention preferably furthermore comprises an interface at the control unit for communicating with an internal bus system of the vehicle to provide at least a braking signal to the bus system.

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed herein after. Further, the features described in the description, the drawings and the claims disclosing the invention may be implemented alone or in combination. In particular, any reference signs in the claims are not to be construed as limiting the scope of the invention. The wording "comprising" does not exclude other elements or steps. The word "a" or "an" does not exclude the plurality. The wording "a number of" items comprising also the number 1, i.e. a single item, and further numbers like 2, 3, 4 and so forth.

BRIEF DESCRIPTION OF THE DRAWINGS

In the accompanying drawings.

DETAILED DESCRIPTION OF THE DRAWINGS

Figure 1:
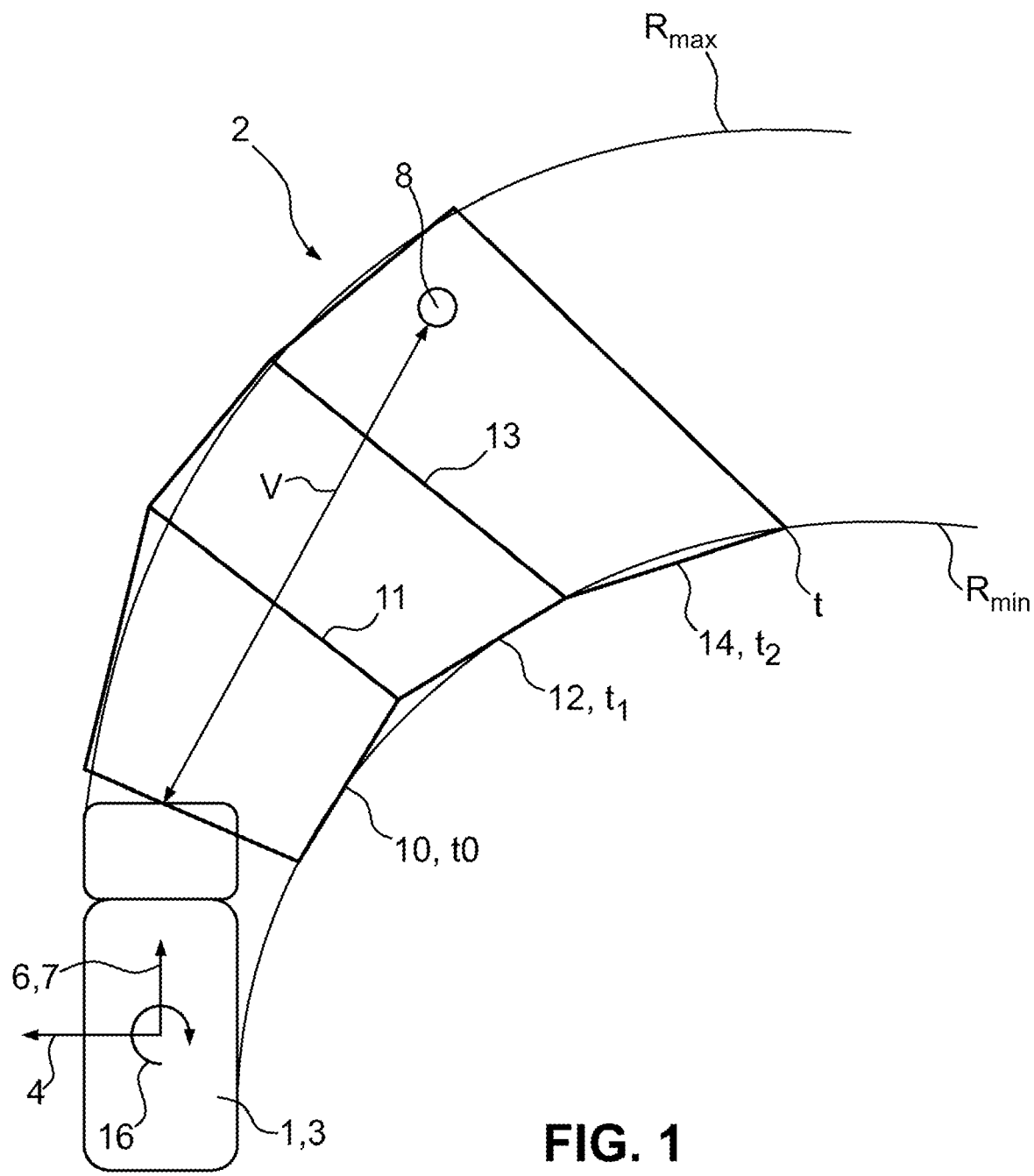
FIG. 1 shows a schematic view of a vehicle and an adaptive monitoring area.

According to FIG. 1, a vehicle 1, in particular a truck 3, has an adaptive monitoring area 2 in front of it. The vehicle 1 has specific vehicle parameters, namely a maximum lateral acceleration 4, a current longitudinal velocity 6, and a maximum longitudinal acceleration 7. Moreover, the vehicle 1 comprises a yaw rate 16. These values are normally measured using sensors in a known manner.

The adaptive monitoring area 2 is generated based on these values and in FIG. 1 shown to be curved to the right-hand side of FIG. 1. This is due to the fact that the vehicle 1 is turning and running along a curve to the right. The curve is characterized by a maximum road curve radius $R_{MAX}$ and a minimum road curve radius $R_{MIN}$. The minimum road curve radius $R_{MIN}$ may be defined by the curve of the street, or the pedestrians' way or the edge of the street. Maximum road curve radius $R_{MAX}$ in this instance may be defined by the maximum radius the vehicle 1 could take without running into the wrong direction, i.e. the lane of the other direction. The adaptive monitoring area 2 is generated also based on this minimum and maximum road curve radius $R_{MIN}$, $R_{MAX}$.

In the embodiments shown in FIG. 1, the adaptive monitoring area 2 comprises three quadrilaterals, namely a first quadrilateral 10, a second quadrilateral 12 and a third quadrilateral 14. The adaptive monitoring area 2 is generated to cover a predetermined time frame t, which in this embodiment may be 1.5 seconds. This predetermined time frame t is divided by the number of quadrilaterals, in this case three. Thus, this quadrilateral is associated for a time of 0.5 seconds. The first quadrilateral 10 is associated with the time frame t0 of 0.5 seconds, the second quadrilateral 12 is associated with the second time frame t1 of 0.5 seconds and the third quadrilateral 14 is associated with a third time frame t2 of 0.5 seconds. Together they cover the time of predetermined time frame t and the area, in which the vehicle 1 could be within this predetermined time frame t.

As can be seen, the quadrilaterals 10, 12, 14 are stacked in front of each other such that the first and second quadrilateral 10, 12 comprise a first common side 11 and the second and third quadrilateral comprise a second common side 13. In case the adaptive monitoring area 2 comprises further quadrilaterals as, e.g. a fourth, fifth, and so forth quadrilateral, again, they would be stacked in front of the third quadrilateral 14 and comprise a third common side with the third quadrilateral 14. I The invention is not restricted to three quadrilaterals and that a number of quadrilaterals could be chosen dependent on the application, or could also change during a single ride of the vehicle 1. E.g., the number of quadrilaterals could be based on the current velocity of the vehicle 1 and/or the load of the vehicle 1.

As it can also be seen in FIG. 1, the quadrilaterals 10, 12, 14 are wider to the front to account for the higher uncertainty for later time frames as, in particular, the latest time frame t2 in this embodiment.

In the embodiment shown in FIG. 1, a vulnerable road user (VRU) 8 is present in the current third quadrilateral 14. A vulnerable road user might be any vulnerable user as, e.g., a pedestrian, cyclist, motorcycle rider, car driver, or the like. The vulnerable road user 8 has the vicinity V to the vehicle 1. When such a vulnerable road user 8 is identified within the adaptive monitoring area 2, it is further determined, whether there is a collision risk between the vehicle 1 and the vulnerable road user 8. The definition of whether there is a collision risk may in one embodiment answered with "yes", when the vulnerable road user 8 is within the adaptive monitoring area 2. Moreover, additional information such as a likely trajectory of the vehicle 1 could be taken into account to determine whether there is a collision risk. When, for example, the vulnerable road user 8 has a high velocity himself, e.g., with respect to FIG. 1 into the upper-left direction such that it is estimated when the vehicle 1 moves forward that the vulnerable road user 8 would not be within the adaptive monitoring area 2 anymore, and it could be determined that there is no collision risk.

Figure 3:
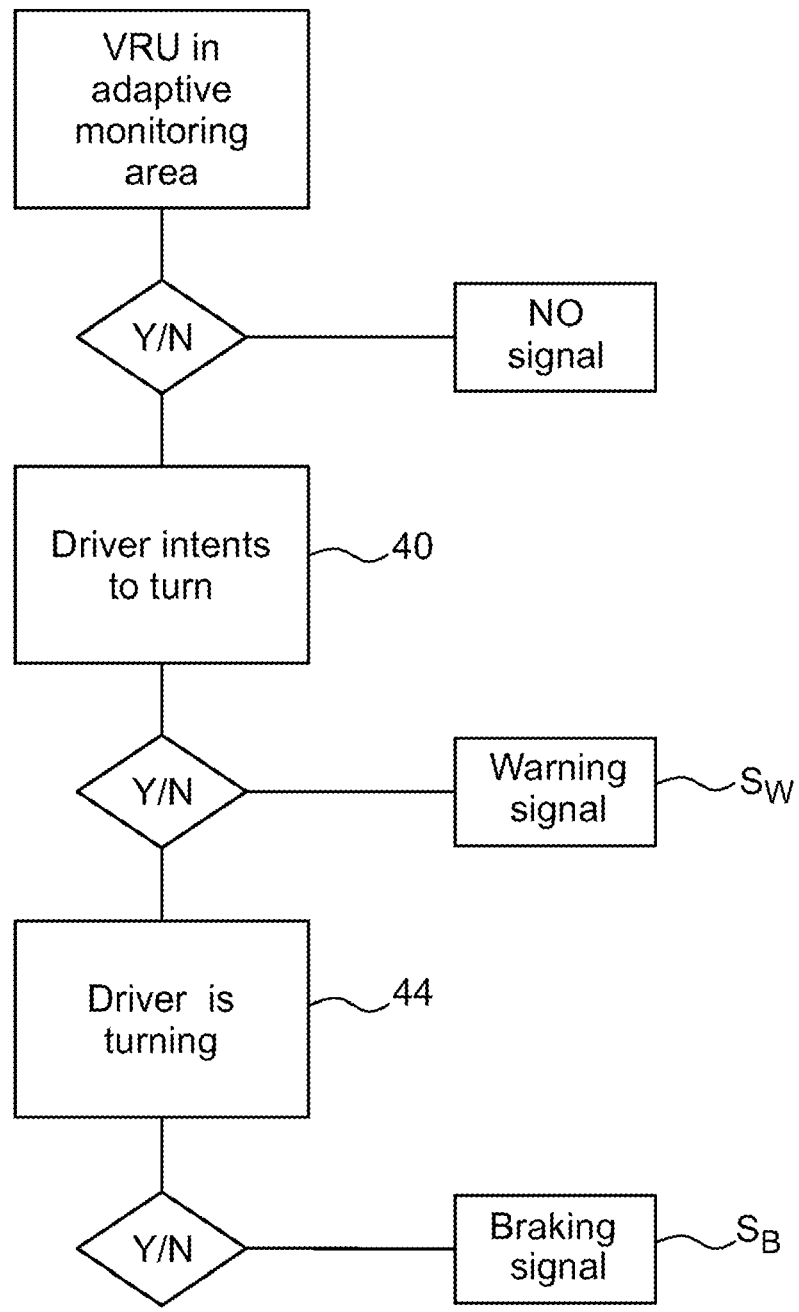
FIG. 3 shows a further flow chart of a part of the method of warning the driver of the vehicle.
Figure 4:
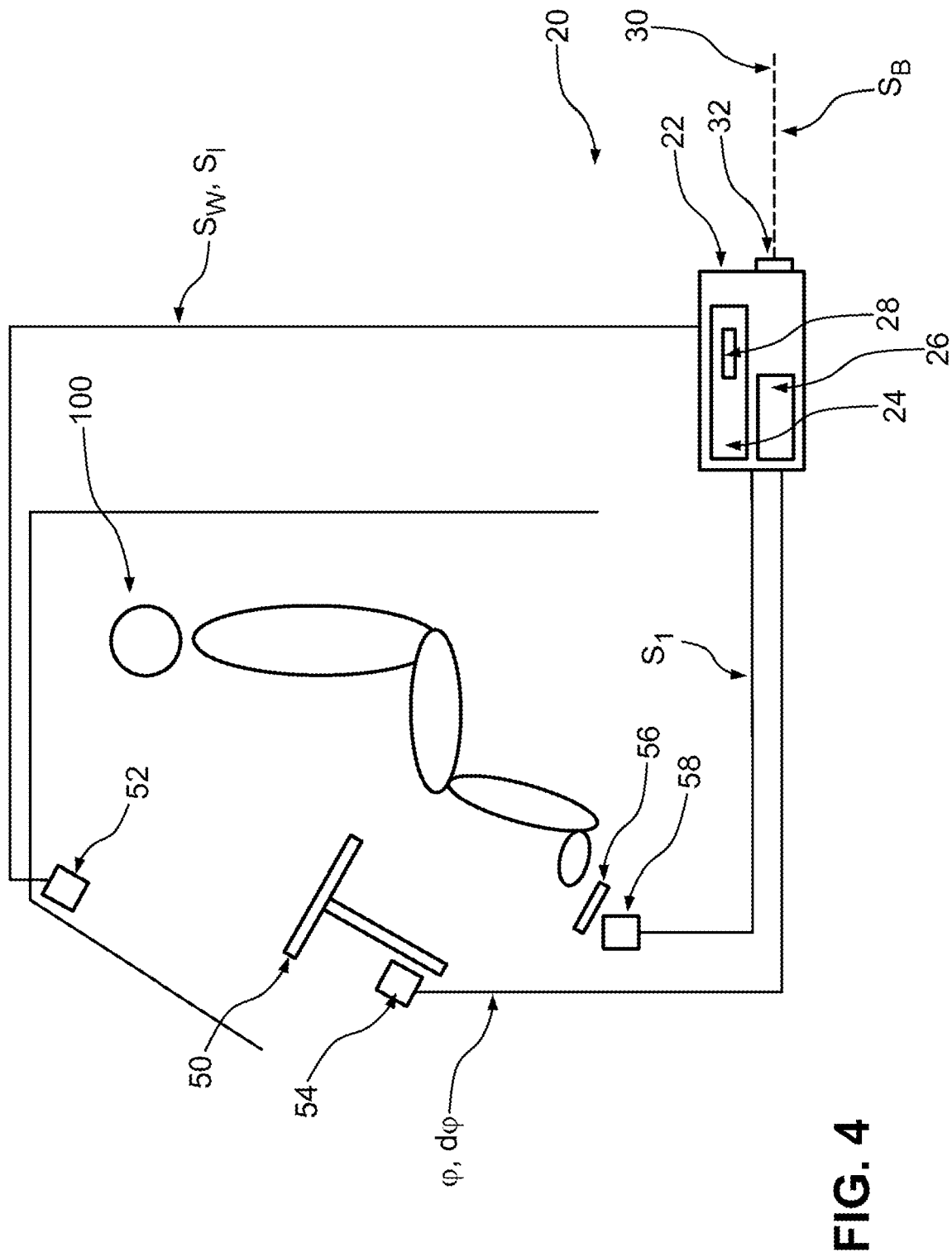
FIG. 4 shows a schematic side view of a vehicle comprising a turn assist system.

Dependent on further actions of the driver 100 (see FIG. 4), one or more actions could be taken as, in particular, outputting a warning signal SW (see FIG. 3, 4).

Figure 2:
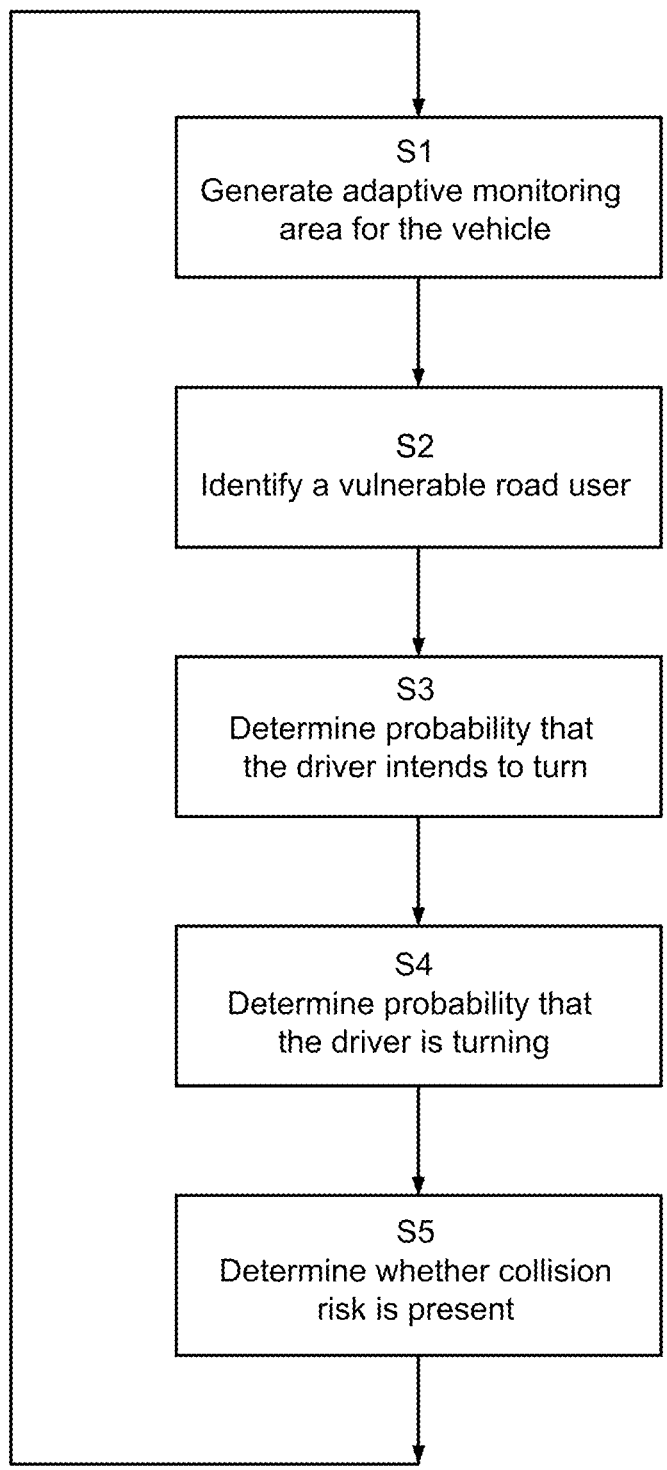
FIG. 2 shows a schematic flow diagram of the method for warning a driver of a vehicle.

The general structure of the method according to the present application is shown in FIG. 2. The steps S1 to S5, shown in FIG. 2, might be carried out at least partially in a parallel manner, or one after each other. The method preferably is run again and again during the complete travel of the vehicle 1 as it is necessary to adapt the adaptive monitoring area 2 dependent on different driving situations.

In the first step S1, an adaptive monitoring area for the vehicle is generated. This is carried out as has been described with respect to FIG. 1, based on at least a maximum lateral acceleration 4 of the vehicle 1 at a current longitudinal velocity 6 of the vehicle 1. Moreover, the maximum longitudinal acceleration 7, the yaw rate 16, and change in this yaw rate 16, as well as minimum and maximum road curve radius $R_{MIN}$, $R_{MAX}$, can be taken into account.

For actually calculating the adaptive monitoring area 2, it is important to take into account all possible vehicle positions in future. To do this for the left edge of the adaptive monitoring area 2 (see FIG. 1), the maximum road curve radius $R_{MAX}$ and maximum feasible lateral acceleration 4 constraints are considered. Similarly, for right edge calculation, the calculation of the adaptive monitoring area 2 (see FIG. 1) minimum road curve radius $R_{MIN}$ and maximum feasible lateral acceleration 4 constraints are considered. Also for acceleration of the adaptive monitoring area 2, to detect the scenario where braking intervention via outputting the braking signal SB is required, only current dynamics of the vehicle 1 are taken into account, i.e. current velocity 6, yaw rate 16. No assumptions on dynamic and environmental constraints are considered for braking related adaptive monitoring area 2 acceleration.

When the adaptive monitoring area 2 has been generated, it is monitored all the time. In step S2, a vulnerable road user 8 is identified within the adaptive monitoring area 2 (see also FIG. 1). When the vulnerable road user 8 is identified (S2) it is determined whether it is the driver's intention to turn. This, according to the present embodiment, includes two steps S3, S4. In Step S3, the probability that the driver intends to turn is determined. In Step S4, the probability that the driver is turning is determined.

In one aspect of the invention, the step determining S3 a probability of the driver intends to turn 40 (see also FIG. 3) is based on a steering wheel angle φ, a rate of change dφ of the steering wheel angle φ and a velocity 6 of the vehicle 1. When, for example, the steering wheel angle φ is still rather small, but the rate of change dφ of the steering wheel angle φ is high, and the velocity 6 of the vehicle 1 is low, the probability that the driver intends to turn is rather high. On the other hand, when the steering wheel angle φ is small, a rate of change dφ of the steering wheel angle φ is low, and the velocity 6 of the vehicle is high, the probability of the driver intends to turn 40 is normally rather low and the small steering wheel angle φ is an indicator for a lengthy stretched curve.

In a similar manner, the step determining S4 a probability that the driver is turning, in one aspect of the invention is based on the steering wheel angle φ and the velocity 6 of the vehicle 1.

For both values, the probability of the driver intends to turn and he probability of the driver is turning, it is assumed that when this probability value is 70% or more that the driver actually intends to turn and that the driver is turning respectively. In the last step S5, it is determined whether there is a collision risk between the vehicle 1 and the vulnerable road user 8, based on the adaptive monitoring area and the driver's intention to turn. Optionally, a warning signal SW may be outputted based on the above.

According to the present application, there are three levels of actions, which will be described now with respect to FIG. 3.

When there is no vulnerable road user 8 in the adaptive monitoring area 2, no signal is output. When a vulnerable road user 8 is identified within the adaptive monitoring area 2, in the next step, it is determined whether the driver 100 intends to turn. This is done with respect to FIG. 2, in steps S3 and S4. When it is determined that the driver 100 does not intend to turn, the warning signal SW is output. Usually, in this case, it is determined that there is no collision risk, even though the vulnerable road user 8 is identified within the adaptive monitoring area 2, the vehicle 1 will trespass along the vulnerable road user 8 without any further collision risk. The driver 100, however, is notified of the vulnerable road user 8 being in the adaptive monitoring area by the warning signal. Such a warning signal SW could include a visual or audio signal or also vibration signal of e.g. the steering wheel 50. A visual signal may include a respective sign in the windshield area or in a head-up display area or a side mirror When additionally, it is determined that the driver 100 is turning 44, not only a warning signal SW is output, but preferably a braking signal SB. The braking signal SB preferably is provided via a BUS-system 30 (see FIG. 4) to a central unit of a braking system of the vehicle 1, such that the vehicle 1 autonomously automatically brakes when it is determined that the driver is turning 44 within step S4.

FIG. 4 shows a basic principle of a cabin of the vehicle 1, having the turn assist system 20. The turn assist system 20 comprises a control unit 22, which may be provided within the vehicle. Control unit 22 comprises a memory 24 and a processor 26. On the memory 24, a computer program 28 comprising instructions, which, when carried out by the processor 26, cause the processor 26 to carry out steps of the disclosed method. The control unit 22 moreover comprises an interface 32 for a connection to the BUS-system 30.

The vehicle cabin comprises a steering wheel 50 as it is known in the art. In the cabin, moreover, there is a signal element 52 for outputting the warning signal SW and potential information signal SI. The steering wheel 50 is provided with a steering wheel sensor 54, which provides the steering angle φ and change in the steering wheel angle dφ to the control unit 22. Control unit 22 moreover is connected to a gas pedal 56, in particular to a gas pedal sensor 58. Gas pedal sensor 58 provides a gas signal S1 to the control unit 22.

When control unit 22 determined that a vulnerable road user 8 is within the adaptive monitoring area 2, and that a collision risk between the vehicle 1 and the vulnerable road user 8 is present, at least a warning signal SW is output via the signal element 52, and/or a braking signal SB is output via the BUS-system 30 to a central control of the braking system.

What is claimed is:

1. A method for warning a driver of a vehicle (1) in turn maneuvers by a control unit, the method comprising the following steps:
   generating (S1) an adaptive monitoring area (2) for the vehicle (1) based on at least a maximum lateral acceleration (4) of the vehicle (1) at a current longitudinal velocity (6) of the vehicle (1);
   identifying (S2) a vulnerable road user (VRU) (8) within the adaptive monitoring area (2);
   determining (S3, S4) a driver's intention to turn (40) the vehicle (1);
      wherein the step of determining the driver's intention to turn the vehicle (1) includes:
         determining (S3) a probability that the driver intends to turn (40); and
         determining (S4) a probability that the driver is turning (44);
   determining (S5) whether there is a collision risk between the vehicle (1) and the VRU (8); and
   outputting a warning signal (SW) warning the driver (100) that the VRU (8) is in a vicinity (V) of the vehicle (1) and that a collision may occur when the driver (100) starts turning upon determining that:
      the VRU (8) is identified within the adaptive monitoring area (2);
      the driver does not intend to turn (40) based on the determined probability that the driver intends to turn being below a first threshold; and
   additionally outputting a braking signal (SB) for braking the vehicle (1) upon additionally determining that the driver (100) is turning (44) based on the determined probability that the driver is turning being above a second threshold.

2. The method according to claim 1, wherein the adaptive monitoring area (2) includes at least a first quadrilateral (10) in front of the vehicle (1).

3. The method according to claim 2, wherein the adaptive monitoring area (2) includes at least a second quadrilateral (12) and a third quadrilateral (14) in front of the vehicle (1), wherein the first quadrilateral (10) and the second quadrilateral (12) adjoin each other at a first common side (11), and the second quadrilateral (12) and the third quadrilateral (14) adjoin each other at a second common side (13).

4. The method according to claim 1, wherein the adaptive monitoring area (2) covers a predetermined time frame (t) for a movement of the vehicle (1), wherein the predetermined time frame (t) is in the range of 1.0 second to 3.0 seconds.

5. The method according to claim 4, comprising the step of splitting the predetermined time frame (t) by a predetermined number of quadrilaterals (10, 12, 14) such that each quadrilateral (10, 12, 14) of the predetermined number of quadrilaterals covers a portion (t0, t1, t2) of the predetermined time frame (t).

6. The method according to claim 1, wherein generating (S1) the adaptive monitoring area (2) for the vehicle (1) is further based on a maximum road curve radius ($R_{MAX}$) and minimum road curve radius ($R_{MIN}$).

7. The method according to claim 1, wherein generating (S1) the adaptive monitoring area (2) for the vehicle (1) is further based on a maximum longitudinal acceleration (7) and/or change in acceleration (7) of the vehicle (1).

8. The method according to claim 1, wherein generating (S1) the adaptive monitoring area (2) for the vehicle (1) is further based on a maximum yaw rate (16) and/or change in yaw rate (16) of the vehicle (1).

9. The method according to claim 1, wherein the probability that the driver intends to turn (40) is determined based on:
   a steering wheel angle (φ);
   a rate of change (dφ) of the steering wheel angle (φ); and
   a velocity (6) of the vehicle (1).

10. The method according to claim 9, comprising:
  calculating a predicted steering wheel angle ($\varphi$) for the adaptive monitoring area (2) using the steering wheel angle ($\varphi$), the rate of change ($d\varphi$) of the steering wheel angle ($\varphi$), and the velocity (6) of the vehicle (1).

11. The method according to claim 9, wherein, when the determined probability that the driver intends to turn (40) is 70% or more, it is assumed that it is the driver's intention to turn (40).

12. The method according to claim 1, wherein the probability that the driver is turning is determined based on:
  a steering wheel angle ($\varphi$); and
  a velocity (6) of the vehicle (1).

13. The method according to claim 12, wherein when the determined probability that the driver is turning (44) is 70% or more, it is assumed that the driver is turning (44).

14. The method according to claim 1, further comprising the step of outputting an information signal (SI) informing the driver (100) that the VRU (8) is in the vicinity (V) of the vehicle (1), upon determining that
  the VRU (8) is identified within the adaptive monitoring area (2);
  the driver does not intend to turn (40); and
  the driver is not turning (44).

15. The method according to claim 1, further comprising the step of outputting the warning signal (SW) warning the driver (100) that the VRU (8) is in the vicinity (V) of the vehicle (1) and that a collision may occur when the driver (100) starts turning upon determining that:
  the VRU (8) is identified within the adaptive monitoring area (2);
  the driver intends to turn (40); and
  the driver is not turning (44).

16. The method according to claim 1, further comprising the step of outputting the braking signal (SB) for braking the vehicle (1) upon determining that:
  the VRU (8) is identified within the adaptive monitoring area (2);
  the driver (100) intends to turn (40); and
  the driver (100) is turning (44).

17. A non-volatile computer memory storing a computer program (28) comprising instructions which, when the computer program (28) is executed by a processor (26), cause the processor (26) to carry out the steps of the method of claim 1.

18. A turn assist system (20) for the vehicle (1) for warning the driver (100) of the vehicle (1) in turn maneuvers, comprising the control unit for the vehicle (1), the control unit (22) comprising:
  the non-volatile computer memory (24) according to claim 17; and
  the processor (26) configured to perform the computer program (28) stored on the non-volatile computer memory.

19. The turn assist system (20) of claim 18, wherein the control unit (22) comprises an interface (32) for communicating with an internal BUS-system (30) of the vehicle (1) to provide at least the braking signal (SB) to the BUS-system (30).

* * * * *